United States Patent [19]

Zwirn

[11] Patent Number: 5,033,015

[45] Date of Patent: Jul. 16, 1991

[54] AUTOMATED SYSTEM FOR TESTING AN IMAGING SENSOR

[75] Inventor: Robert Zwirn, Los Angeles, Calif.

[73] Assignee: Hughes Aircraft Company, Los Angeles, Calif.

[21] Appl. No.: 604,386

[22] Filed: Oct. 25, 1990

Related U.S. Application Data

[63] Continuation of Ser. No. 231,319, Aug. 12, 1988, abandoned.

[51] Int. Cl.$^5$ .................. G05B 23/02; H04N 17/00
[52] U.S. Cl. ............................ 364/579; 364/525; 358/10; 358/139
[58] Field of Search ............... 364/579, 550, 551.01, 364/525, 571.07; 382/18, 34, 51, 53, 54; 358/10, 139

[56] References Cited

U.S. PATENT DOCUMENTS

| | | | |
|---|---|---|---|
| 4,065,647 | 12/1977 | Frye et al. | 364/579 X |
| 4,234,890 | 11/1980 | Astle et al. | 358/139 X |
| 4,249,197 | 2/1981 | van Spaandonk et al. | 358/139 X |
| 4,326,219 | 4/1982 | Griesshaber | 358/139 X |
| 4,414,573 | 11/1983 | Griesshaber et al. | 358/139 X |
| 4,538,268 | 8/1985 | Pham Van Cang | 364/579 X |
| 4,608,657 | 8/1986 | Manome et al. | 364/579 X |
| 4,656,665 | 4/1987 | Pennebaker | 382/51 |
| 4,694,342 | 9/1987 | Klees | 382/54 X |
| 4,731,863 | 3/1988 | Sezan et al. | 382/51 |
| 4,811,097 | 3/1989 | Ritter et al. | 358/139 X |
| 4,823,194 | 4/1989 | Mishima et al. | 382/53 X |
| 4,827,533 | 5/1989 | Tanaka | 382/54 |
| 4,862,385 | 8/1989 | Fujita et al. | 341/123 X |
| 4,876,729 | 10/1989 | Watanabe et al. | 382/54 |
| 4,951,141 | 8/1990 | Fischer | 358/139 |
| 4,961,155 | 10/1990 | Ozeki et al. | 364/571.07 |

OTHER PUBLICATIONS

Crosby et al., "A Microprocessor-Based Video Analyzer", Conference: Int'l. Conf. on T.V. Measurements, London, Eng. May 21-23, 1979, pp. 197-204.

Primary Examiner—Joseph L. Dixon
Attorney, Agent, or Firm—William J. Streeter; Wanda K. Denson-Low

[57] ABSTRACT

An automated system for testing imaging sensors 10 is disclosed. The automated system 10 provides an accurate and repeatable method for testing imaging sensors. The automated system 10 includes an input circuit 20 for receiving input from an imaging sensor system and providing a signal in response thereto, a processor 30 for operating on said signal and generating data therefrom, and a computer 40 for providing output in response to the data. A specific teaching of the invention includes a method for obtaining data for the lookup table and calculating addresses for the data wherein the addresses are a function of the signal and noise components of the imaging sensor system output, while the data relates to actual responses of human observers.

23 Claims, 2 Drawing Sheets

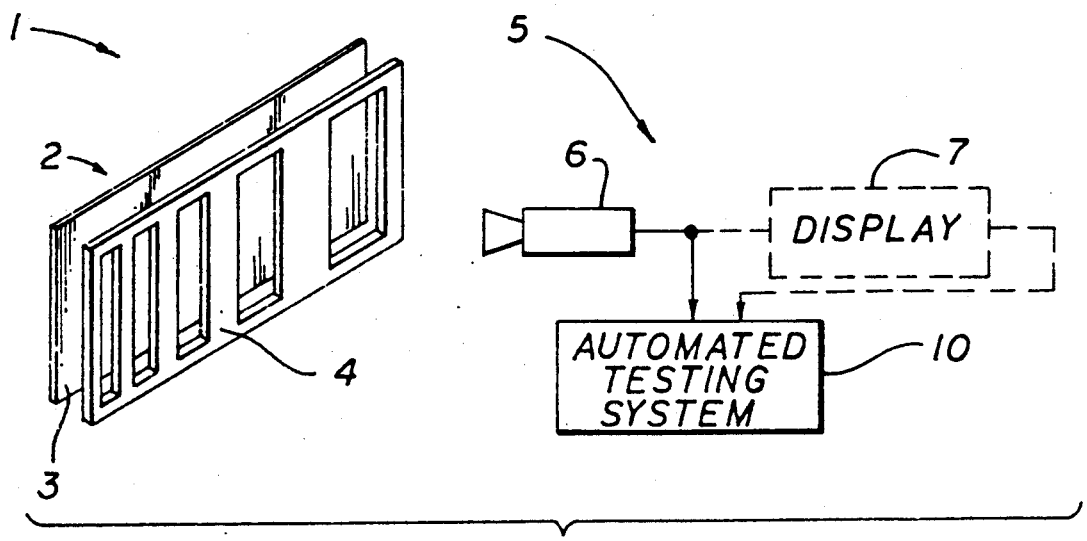
FIG. 1.
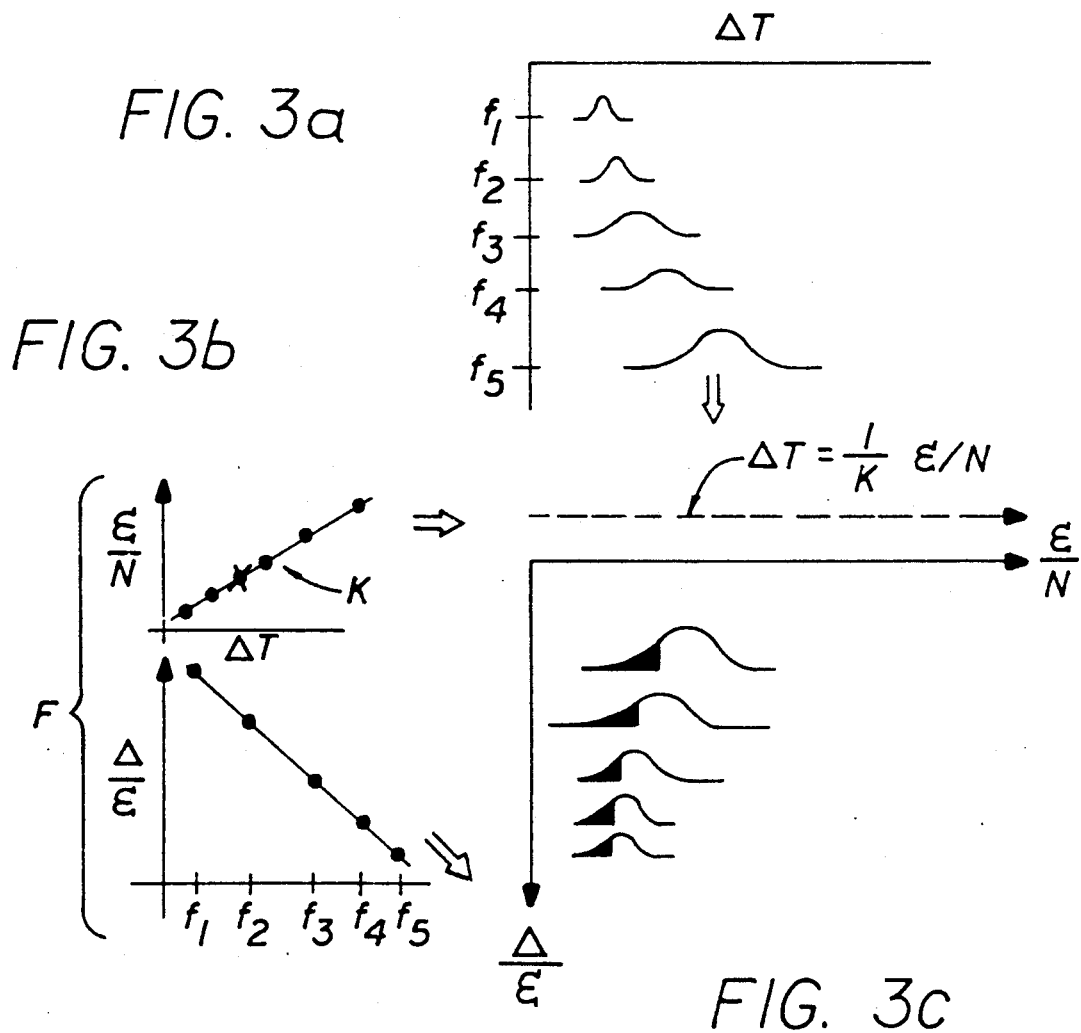
FIG. 3a
FIG. 3b
FIG. 3c

AUTOMATED SYSTEM FOR TESTING AN IMAGING SENSOR

This is a continuation of application Ser. No. 07/231,319 filed Aug. 12, 1988, now abandoned, by R. Zwirn for AUTOMATED SYSTEM FOR TESTING AN IMAGING SENSOR.

BACKGROUND OF THE INVENTION

1. Field of the Invention

The present invention relates to automated testing systems. More specifically, the present invention relates to automated systems for testing imaging sensors to qualify the sensor performance in the area of minimal resolvable signatures.

While the present invention is described herein with reference to a particular embodiment for an illustrative application, it is understood that the invention is not limited thereto. Those having ordinary skill in the art and access to the teachings provided herein will recognize additional modifications, applications and embodiments within the scope thereof.

2. Description of the Related Art

It is currently common practice to use human observers to rate, evaluate and otherwise determine if an imaging sensor meets specifications. The use of human observers for testing the imaging sensor has several drawbacks.

In most cases, the human observer must be specially trained. This training is generally both time consuming and costly. In addition, human observers vary, even after such special training, in the determination of acceptable output for the sensor under test. The lack of repeatability of human perception of sensor output for both an individual human observer and between groups of human observers can increase the occurrence of improper rating of imaging sensors. Also, because imaging sensors are evaluated via subjective visual displays, it may be difficult to determine if the output from an imaging sensor meets objective specifications.

Applications for imaging sensors include infrared systems used by ground and airborne military personnel, radar systems for aircraft detection and navigation, and television systems for visual monitoring. Each application may impose a different set of requirements on the imaging sensor. Under these circumstances, when human observers are employed to test the sensors, it may be difficult to obtain an appropriate standard by which to measure sensor outputs.

In some cases, the standard by which the sensors are measured may be based on the perception of some specific group of the human observers over a given sample or time period. Unfortunately, as human observers vary, from day-to-day, in ability to properly evaluate a sensor, some sensors may be deemed acceptable, under such a standard, when the sensor is faulty, or vice versa.

In addition to the fact that the human determination of sensor acceptability can be time consuming, many adverse consequences are known to follow from an improper evaluation of a sensor. Acceptable sensors thought to be faulty can be costly to replace or repair. The identification and replacement of an improperly passed sensor by an end user may be costly as well. Additional expenses may be incurred in shipping, receiving, evaluating and reshipping such sensors.

Further, a human rating of an imaging sensor can typically be performed only when the sensor assembly is completed such that a visual output may be obtained. This late testing of sensors is problematic in that faults can not be detected early in the assembly of the sensor. Problems found in completed sensor assemblies are typically much more costly to correct than those discovered in subassemblies prior to integration. That is, faulty components may not be replaced and improper assembly may not be corrected prior to completion of the sensor assembly.

There is therefore a need in the art for a test system or method for accurately and repeatably determining the acceptability of sensor outputs rapidly and early in the manufacturing cycle. Ideally, the test system or method would provide a means for emulating a group of human observers to optimally determine the acceptability of an imaging sensor.

SUMMARY OF THE INVENTION

The need in the art is substantially addressed by the automated system for testing imaging sensors of the present invention. The invention also provides an accurate and repeatable method for testing imaging sensors. The system of the invention includes input circuitry for receiving input from an imaging sensor system and providing a signal in response thereto, a processor for operating on the signal and generating data therefrom, and a lookup table for providing output in response to the data. A specific teaching of the invention provides a method for obtaining data for the lookup and calculating addresses for the data wherein the addresses are a function of the signal and noise components of the imaging sensor system output, while the data relates to actual responses of human observers.

BRIEF DESCRIPTION OF THE DRAWINGS

FIG. 1 shows an infrared imaging system and a typical test setup.

FIG. 3a shows the MRT declarations of several observers as a statistical distribution of the temperature difference at each spatial frequency.

FIG. 3b shows the corresponding contribution of a function, F, for each declared MRT of each observer at each frequency.

FIG. 3c is a two dimensional depiction of the value stored in the lookup table for function F related to the temperature difference (delta T).

DESCRIPTION OF THE INVENTION

Figure 2:
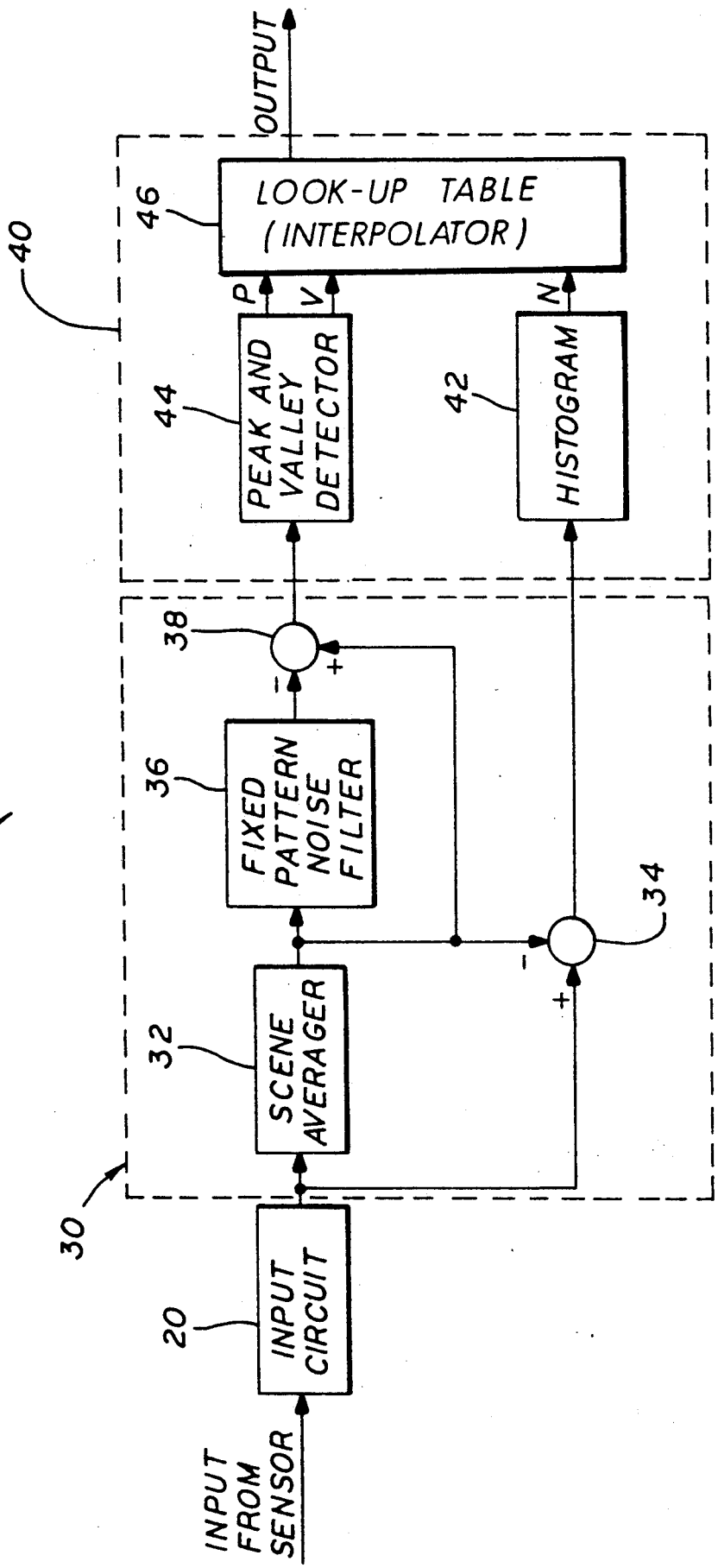
FIG. 2 is a simplified block diagram of an automated system for testing a sensor system constructed in accordance with the present teachings.

The present invention is a system which provides an accurate and repeatable method for testing a variety of imaging sensors. FIG. 1 shows a typical test setup 1 for an infrared imaging sensor system 5. The target 2 includes a black body 3 which is at one temperature and frame with a plurality of bars 4 at a second temperature. The widths of the bars 4 correspond to the desired test frequencies for the sensor system 5. The invention is not limited to the type of target employed.

The sensor system 5 includes an infrared sensor 6. The sensor system 5 may also include a display 7 (shown in phantom). The sensor 6 views the target 2 and provides an output which may be input directly to the automated system 10 of the present invention or via a scanning of the output of the display 7. It will be appreciated by those skilled in the art that the output of the imaging sensor system may be either analog or digital without departing from the scope of the present invention.

A simplified block diagram of the automated system 10 of the present invention is shown in FIG. 2. As described more fully below, the system 10 includes an input circuit 20, an image processor 30 and a computer 40. The input circuit 20 provides an interface between the sensor system 5 and the processor 30. Those skilled in the art with access to the present teachings will be able to design a suitable input circuit capable of receiving input from the desired imaging sensor system and providing an analog or digital output to the processor 30. For example, if the input signal is analog, the input circuit 20 would include an analog-to-digital (A/D) converter to provide a digital signal to the processor 30. If, however, the output is received from the sensor 6 via the display 7, the input circuit 20 may include a television camera or other device for receiving optical input.

The processor 30 includes a scene averager 32 to remove time-random noise from the input signal leaving a stationary signature. The scene averager 32 may include memory and arithmetic circuitry for repeatedly storing and averaging successive frames of input from the sensor system or other means for removing time-random noise from the input signal.

A first subtractor 34 subtracts the pure signature from the input signal leaving pure noise. The pure noise is input to a histogram generator 42 which, along with a peak and valley detector 44 and a lookup table 46, are implemented within the computer 40 in the preferred embodiment. (The histogram generator 42 may also be implemented with a microprocessor or special purpose integrated circuit.) The histogram generator 42 provides noise data $N_i$ indicating which portion of the pure noise signal is at each of several signal levels.

The pure signature output of the scene averager 32 is provided to a noise filter 36 which provides the fixed pattern noise of the pure signature as an output. Typically, the noise filter 36 is a memory that contains the fixed pattern noise of the input signal which may be extracted by scanning a uniform scene. It will be appreciated by those skilled in the art that the type of fixed pattern noise filter 36 may vary without departing from the scope of the present invention.

A second subtractor 38 subtracts the fixed pattern noise from the pure signature leaving a pure signal. The peak and valley detector 44 receives the pure signal output from the subtractor 38. The detector 44 provides data indicating the peak $P_i$ and valley $V_i$ values of the pure signal. (The peak and valley detector may also be implemented in a microprocessor or special purpose integrated circuit and the present invention is not limited to the particular implementation thereof.)

The peak data $P_i$, valley data $V_i$, and noise data $N_i$, are output to the lookup table 46. A function of $P_i$, $V_i$ and $N_i$ is provided as a complex address to the lookup table and the lookup table 46 provides one or more outputs which indicate the acceptability of the sensor system. The mathematical functions for F could include a square-wave modulation transfer function, $(P_i-V_i)/(P_i+V_i)$, which relates directly to the response to different spatial frequencies and a function, $(P_i+V_i/N_i)$, which relates directly to the sensor system 5 temperature difference. For the sensor system 5, a single temperature for the bars 4 may be used because the mathematical function $(P_i+V_i/N_i)$ does relate directly to temperature and not to frequency. Alternately, the square-wave modulation transfer function relates to spatial frequency response and not to temperature. Those skilled in the art and with access to the present teachings will appreciate that the mathematical function, F, of the signature can include other variables and relationships in addition to $P_i$, $V_i$ and $N_i$ without departing from the scope of the present invention.

Human observers are used initially to collect the data for the lookup table 46. The human observers control the temperature and view the output of the imaging sensor system to determine when the displayed information is acceptable. $P_i$, $V_i$ and $N_i$ are collected for each acceptable temperature setting. For the sensor system 5, a determination of an acceptable temperature setting is made for each individual input frequency pattern. The output of the lookup table 46 can represent the judgment of any desired sub-group of the human observers. For example, the top ten percent of the human observers could be used for the data, or an average of the human observers could be used. The table 46 may also include an interpolator (not shown) for estimating the values of the stored data from a derived function of the data.

FIGS. 3a-3c illustrate the extraction of the lookup table data for the sensor system 5. An observer views the display 7 and declares when the bars 4 may be seen with fifty percent probability for each spatial frequency. The temperature difference (delta T) between the black body 2 and the bars 4 is recorded as the minimum resolvable temperature (MRT). FIG. 3a shows the MRT declarations of several observers as a statistical distribution of the temperature difference (delta T) at each spatial frequency. F is a function of the data $P_i$, $V_i$ and $N_i$. For example, FIG. 3b shows two examples of corresponding components of the function, F, for each declared MRT of each observer at each frequency. The upper figure is for the component of a function F, the sum divided by the noise, while the lower figure is for a component, the difference divided by the sum. FIG. 3c is a merging of FIGS. 3a and 3b and is a two dimensional depiction of the relationship between the compound function F and the declared temperature difference, delta T. Each compound function value, F, is the address for the corresponding sum/noise distribution data and the associated acceptance criteria. For example, values of ratio of the difference to the sum (delta/sigma) intercept the operator statistical distributions to yield an acceptance limit on the ratio of the sum to noise (sigma/N). The derived scale factor, K, determines the corresponding scale for delta T which relates the sum/noise limit to a corresponding delta T criteria to complete the lookup operation shown in FIG. 3c.

Data may be collected in a similar manner for other types of sensor systems. For example, for a radar system the data may be the energy value received by the radar rather than the temperature data from the infrared sensor system 5. Likewise, for a camera system the data may represent the light received by the camera system. Those skilled in the art will appreciate that the type of data collected for the lookup table of the computer 40 may vary without departing from the scope of the present invention.

The output of the lookup table 46 indicates the data that the desired group of observers would have obtained for each spatial frequency. In addition, the output can include the functions, F, which may be useful in statistical quality control. Because the target 2 temperature differences are known, this information may be supplied to the lookup table 46 such that the lookup table 46 outputs a single number indicating the acceptability of the imaging sensor. In the alternative, the lookup table 46 can provide data for subjective diagnostics by a human operator. It will be appreciated by those skilled in the art that the type of output provided by the lookup table 46 may vary without departing from the scope of the present invention.

While the present invention has been described herein with reference to an illustrative embodiment and a particular application, it is understood that the invention is not limited thereto. Those having ordinary skill in the art and access to the teachings of the present invention will recognize additional modifications and applications within the scope thereof. For example, the noise data provided by the processor 30 could be displayed to facilitate the design of an imaging sensor system with less random and fixed pattern noise.

It is therefore intended by the appended claims to cover any and all such modifications, applications and embodiments.

Accordingly, what is claimed is:

1. An automated system for testing a sensor system by evaluating the output of said sensor system with respect to a known target, said automated system comprising:
   input means for receiving input from said sensor system and providing a first signal in response thereto;
   processing means for operating on said first signal and generating first data therefrom, said processing means including:
   filtering means for separating noise from said first signal, said filtering means further including scene averaging means for separating random noise from said first signal to provide a pure signature and first subtracting means for subtracting said first signal from said pure signature to provide a pure noise signal and
   means for computing at least one address in response to a function of the pure signature and pure noise components of said first signal; and
   table means for providing stored data in response to an input of said address thereto, said stored data being representative of a response of at least one human observer viewing a display of the output of an imaging system in response to a known input.

2. The automated system for testing of claim 1 wherein said input means includes camera means for receiving optical output from said imaging system and providing said first signal in response thereto.

3. The automated system for testing of claim 1 wherein said processing means includes histogram means for determining the portions of said pure noise signal that are within a specified range of values.

4. The automated system for testing of claim 1 wherein said filtering means includes memory means for providing a fixed pattern noise signal from said pure signature.

5. The automated system for testing of claim 4 wherein said filtering means includes second subtracting means for subtracting said fixed pattern noise signal from said pure signature to provide a pure signal.

6. The automated system for testing of claim 5 wherein said processing means includes peak means for detecting the value of said pure signal that is greater than a first value and valley means for detecting the value of said pure signal that is less than a second value.

7. The automated system for testing of claim 1 wherein said table means is a lookup table containing stored data.

8. The automated system for testing of claim 7 wherein a function of said first data is provided as an address to said lookup table and said output is provided from said lookup table in response thereto.

9. The automated system for testing of claim 8 wherein said function of said first data includes a peak value P, a valley value V, and a noise component N.

10. The automated system for testing of claim 9 wherein said function is $P-V/P+V$.

11. The automated system for testing of claim 9 wherein said function is $P+V/N$.

12. The automated system for testing of claim 7 wherein said table means includes interpolator means for estimating the values of said stored data from a derived function of said first data.

13. A method for obtaining data representing acceptable imaging sensor system output including the steps of:
   (a) separating the input from an imaging sensor system into signal and noise components;
   (b) obtaining first values representing acceptable values of said input at a set of spatial frequencies as determined by a chosen group of human observers; and
   (c) deriving data as a function of said signal and said noise components at said spatial frequencies corresponding to each value of said first values.

14. An automated system for testing a sensor system by evaluating the output of said sensor system with respect to a known target, said automated system comprising:
   input means for receiving input from said sensor system and providing a first signal in response thereto;
   processing means for operating on said first signal and generating first data therefrom; and
   table means for providing output in response to said first data, said table means including a lookup table, wherein a function of said first data is provided as an address to said lookup table and said output is provided from said lookup table in response thereto, said function of said first data being $P-V/P+V$ where P is a peak value and V is a valley value of said first data.

15. An automated system for testing a sensor system by evaluating the output of said sensor system with respect to a known target, said automated system comprising:
   input means for receiving input from said sensor system and providing a first signal in response thereto;
   processing means for operating on said first signal and generating first data therefrom; and
   table means for providing output in response to said first data, said table means including a lookup table, wherein a function of said first data is provided as an address to said lookup table and said output is provided from said lookup table in response thereto, said function of said first data being $P+V/N$ where P is a peak value, V is a valley value, and N is a noise component of said first data.

16. The automated system for testing of claim 14 or 15 wherein said table means includes interpolator means for estimating the values of said stored data from a derived function of said first data.

17. The automated system for testing of claim 14 or 15 wherein said processing means includes filtering means for separating noise from said first signal.

18. The automated system for testing of claim 17 wherein said filtering means includes scene averaging means for separating random noise from said first signal to provide a pure signature.

19. The automated system for testing of claim 18 wherein said filtering means includes first subtracting means for subtracting said first signal from said pure signature to provide a pure noise signal.

20. The automated system for testing of claim 19 wherein said processing means includes histogram means for determining the portions of said pure noise signal that are within specified ranges of values.

21. The automated system for testing of claim 17 wherein said filtering means includes memory means for providing a fixed pattern noise signal from said pure signature.

22. The automated system for testing of claim 21 wherein said filtering means includes second subtracting means for subtracting said fixed pattern noise signal from said pure signature to provide a pure signal.

23. The automated system for testing of claim 22 wherein said processing means includes peak means for detecting the value of said pure signal that is greater than a first value and valley means for detecting the value of said pure signal that is less than a second value.

* * * * *

UNITED STATES PATENT AND TRADEMARK OFFICE
CERTIFICATE OF CORRECTION

PATENT NO. : 5,033,015
DATED : July 16, 1991
INVENTOR(S) : ROBERT ZWIRN

It is certified that error appears in the above-identified patent and that said Letters Patent is hereby corrected as shown below:

Column 3, Lines 60 and 61, delete "$(P_i - V_i/P_i - V_i)$" and insert therefor --$(P_i - V_i)/(P_i + V_i)$--.

Column 3, Line 62, delete "$(P_i + V_i/N_i)$" and insert therefor --$(P_i + V_i)/N_i$--.

Column 3, Line 66, delete "$(P_i + V_i/N_i)$" and insert therefor --$(P_i + V_i)/N_i$--.

Claim 10, Column 6, Line 9, delete "$P - V/P + V$" and insert therefor -- $(P - V)/(P + V)$--.

Claim 11, Column 6, Line 11, delete "$P + V/N$" and insert therefor --$(P + V)/N$--.

UNITED STATES PATENT AND TRADEMARK OFFICE
CERTIFICATE OF CORRECTION

PATENT NO. : 5,033,015

DATED : July 16, 1991

INVENTOR(S) : ROBERT ZWIRN

It is certified that error appears in the above-identified patent and that said Letters Patent is hereby corrected as shown below:

Claim 14, Column 6, line 42, delete "P - V/P + V" and insert therefor --(P - V)/(P + V)--.

Claim 15, Column 6, line 58, delete "P + V/N" and insert therefor --(P + V)/N--.

Signed and Sealed this

Sixteenth Day of March, 1993

*Attest:*

STEPHEN G. KUNIN

*Attesting Officer*     *Acting Commissioner of Patents and Trademarks*